(12) United States Patent
Garner et al.

(10) Patent No.: US 9,986,680 B2
(45) Date of Patent: Jun. 5, 2018

(54) MOUNTING ARRANGEMENT OF A DOUBLES ELIMINATOR IN A SEED METER

(71) Applicant: Deere & Company, Moline, IL (US)

(72) Inventors: Elijah B. Garner, Bettendorf, IA (US); Kamalakannan Natarajan, Vellore (IN); Beth A. Wolfs, Tiffin, IA (US)

(73) Assignee: DEERE & COMPANY, Moline, IL (US)

( * ) Notice: Subject to any disclaimer, the term of this patent is extended or adjusted under 35 U.S.C. 154(b) by 108 days.

(21) Appl. No.: 14/635,487

(22) Filed: Mar. 2, 2015

(65) Prior Publication Data

US 2016/0255768 A1 Sep. 8, 2016

(51) Int. Cl.
*A01C 7/04* (2006.01)
*A01C 7/12* (2006.01)

(52) U.S. Cl.
CPC .............. *A01C 7/046* (2013.01); *A01C 7/128* (2013.01)

(58) Field of Classification Search
USPC .......................................... 172/558, 560–566
See application file for complete search history.

(56) References Cited

U.S. PATENT DOCUMENTS

| | | | | |
|---|---|---|---|---|
| 712,564 A | * | 11/1902 | Michael ................... | A01C 7/18 111/157 |
| 1,457,960 A | * | 6/1923 | Britten ................... | A01B 15/16 172/168 |
| 4,898,108 A | * | 2/1990 | McDermott ........... | A01C 7/046 111/185 |
| 5,170,909 A | | 12/1992 | Lundie et al. | |
| 5,842,428 A | | 12/1998 | Stufflebeam et al. | |
| 5,848,571 A | * | 12/1998 | Stufflebeam ........... | A01C 7/046 111/181 |
| 7,152,542 B2 | | 12/2006 | Eben et al. | |
| 7,357,193 B2 | * | 4/2008 | Harmon ................. | A01B 23/06 172/566 |
| 7,699,009 B2 | | 4/2010 | Sauder et al. | |
| 8,746,159 B2 | | 6/2014 | Garner et al. | |
| 2007/0039529 A1 | * | 2/2007 | Sauder ................... | A01C 7/046 111/185 |
| 2008/0053352 A1 | * | 3/2008 | Friestad ................. | A01C 7/046 111/174 |
| 2014/0076219 A1 | * | 3/2014 | Adams .................... | A01C 7/046 111/185 |
| 2014/0182496 A1 | * | 7/2014 | Adams .................... | A01C 7/046 111/185 |

FOREIGN PATENT DOCUMENTS

| | | | | |
|---|---|---|---|---|
| DE | 3823414 A1 | * | 2/1989 | ............ A01C 7/046 |
| FR | 2641441 A1 | * | 7/1990 | ............ A01C 7/044 |
| WO | 2010059101 | | 5/2010 | |

* cited by examiner

Primary Examiner — Alicia Torres (57) ABSTRACT

A seed meter is provided having a doubles eliminator mounted to a common spindle with a rotating seed singulating element. The doubles eliminator is axially biased against the seed face of the singulating element to axially position the doubles eliminator relative to the singulating element.

11 Claims, 7 Drawing Sheets

MOUNTING ARRANGEMENT OF A DOUBLES ELIMINATOR IN A SEED METER

FIELD

This disclosure relates to agricultural seeding equipment and in particular to the mounting of a doubles eliminator within a seed meter.

BACKGROUND

A common form of seed meter in widespread use is a pressure differential seed meter, either vacuum seed meter or positive pressure seed meter. The meter includes a housing having a rotatable seed singulating element therein, often a seed disk. On one side of the seed disk, the housing forms a reservoir to hold a pool of seed to be planted. The seed disk has an annular array of apertures through the disk near the disk periphery. An air pressure differential is created between the opposite sides of the disk. This can be the application of a positive pressure on the seed side of the disk or vacuum applied to the opposite side of the disk. When the disk is rotated, the pressure differential causes seed to be adhered to the apertures on the seed disk. The disk rotates to bring seeds, one at a time, in sequence to a release point where the seeds are discharged from the disk and moved sequentially to a furrow opened in the soil below.

The magnitude of the air pressure differential is usually controlled by the machine operator. If there is insufficient pressure differential, seeds will not always adhere to the disk resulting in what is referred to as "a skip" where there was no seed on a given aperture of the disk. Skips result in lost yield potential by a reduced number of seeds planted. Alternatively, too much pressure can result in two or more seeds being adhered to an aperture in the seed disk. This results in what is called "a double" or "multiple." When two seeds are planted together, they compete for water and nutrients with the result being that both plants together do not produce as much as one properly planted plant. To avoid or at least reduce doubles, some form of mechanical seed removal is typically included in the seed meter, referred to as a "doubles eliminator" or in some instances, known as a "singulator" in that it produces single seeds on the apertures. In some instances, the seed disk is referred to as a "singulator" or "singulating element" as it removes seeds from the seed pool one at a time for deposit into the soil. The latter use of the term "singulator" or "singulating element" will be used herein.

Examples of doubles eliminators can be found in prior patents U.S. Pat. No. 7,699,009 to Sauder; U.S. Pat. No. 7,152,542 to Eben; U.S. Pat. No. 5,842,428 to Stefflebeam; and U.S. Pat. No. 5,170,909 to Lundie. One common aspect of each of these doubles eliminators is that they are mounted to the seed meter housing. As a result, there can be significant tolerance stack up between the location of the functional features of the doubles eliminators and the apertures in the seed disk resulting in inconsistent functioning of the doubles eliminator across a plurality of seed meters on the planter.

SUMMARY

The doubles eliminator described in detail below is mounted to the a common spindle with the seed singulator to radially located the functional elements of the doubles eliminator. The doubles eliminator is biased axially against the seed singulator to axially locate the doubles eliminator functional elements. This results in a reduction in the tolerance stack-up between the functional elements of the doubles eliminator and the apertures in the seed disk, producing more accurate operation of the doubles eliminator and ore consistent operation across multiple seed meters on a planter. The doubles eliminator is further restrained circumferentially.

DETAILED DESCRIPTION

Figure 1:
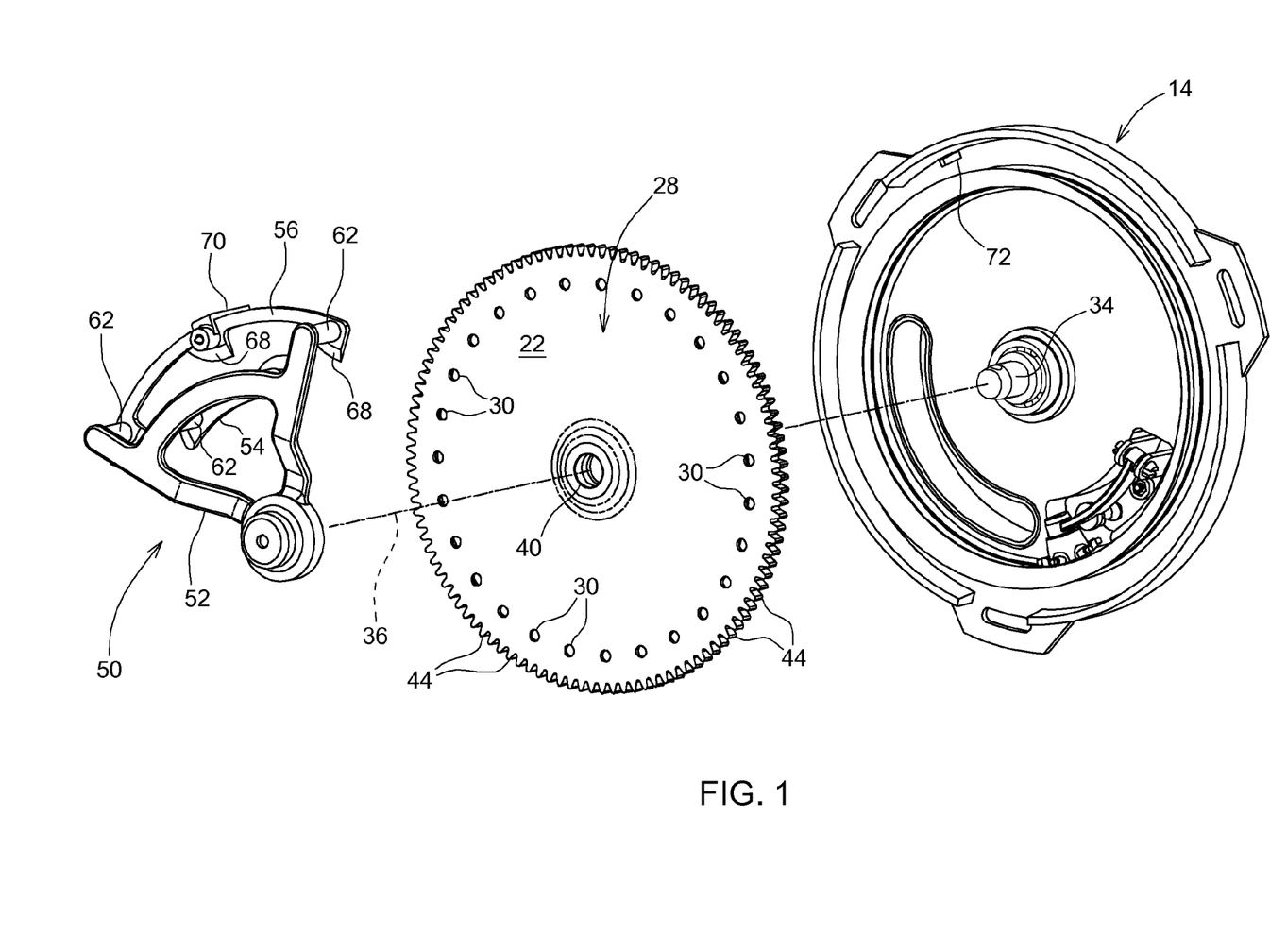
FIG. 1 is an exploded perspective view of a portion of a seed meter.
Figure 4:
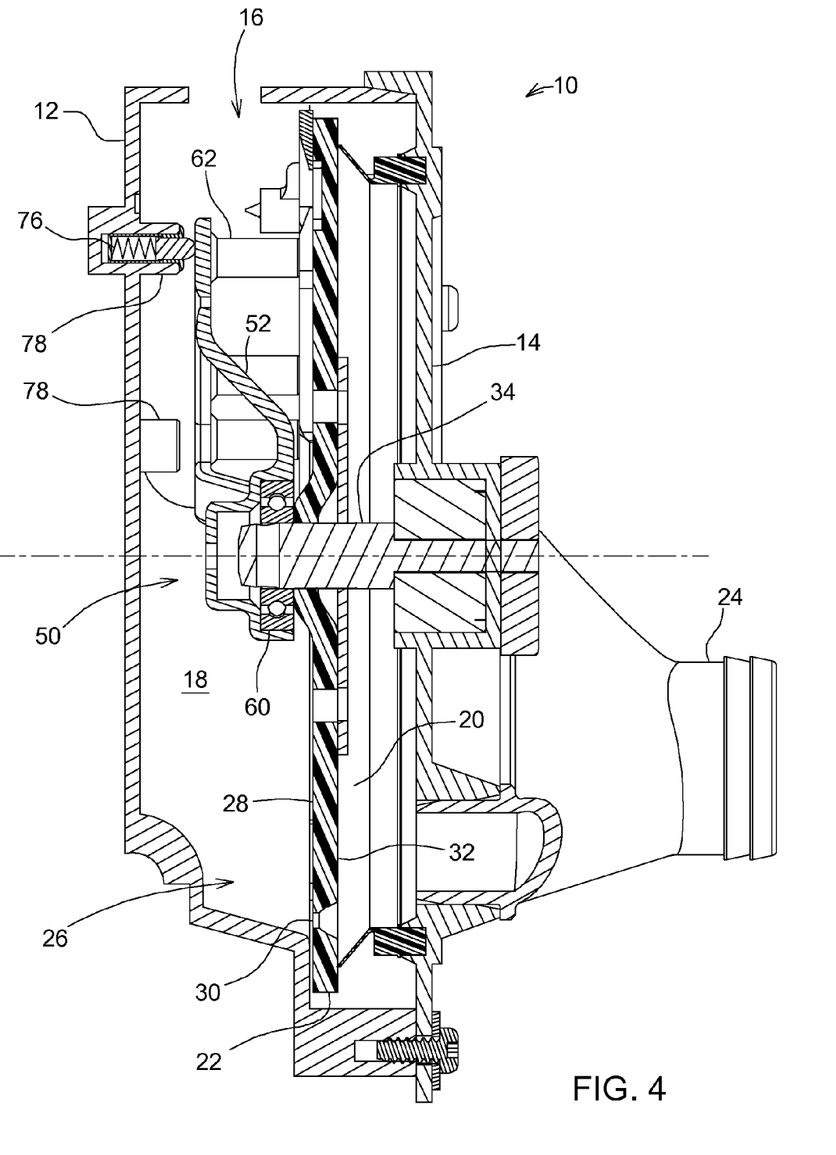
FIG. 4 is a cross section of the seed meter of FIG. 1.

With reference to the figures, a seed meter 10 is shown. Seed meter 10 includes a meter housing 12 and a cover 14. The housing 12 and the cover 14, when assembled, define an enclosed space 16 of the seed meter. The enclosed space is divided into two portions, 18 and 20, by a seed singulator or seed singulating element, shown as a seed disk 22, disposed within the enclosed space 16. The seed meter 10 operates on an air pressure differential between the two portions 18 and 20 of the enclosed space. In the embodiment shown, the air pressure differential is created by a vacuum in the enclosed space portion 20 from a vacuum source (not shown) applied through the hose fitting 24 on the cover 14. Alternative configurations may apply a positive air pressure to the interior space 18. Both configurations are well known in the seeding art.

The meter housing 12 and the seed disk 22 cooperate to define a reservoir 26 within the meter for holding a pool of seed to be planted. The reservoir 26 is the lower part of the enclosed space portion 18, adjacent the seed disk 22. The seed disk 22 may have a seed face 28 which faces and contacts the seed in the reservoir 26. The seed disk 22 further may have a circular array of apertures 30 passing through the seed disk 22 from the seed face 28 to the disk opposite face 32. A spindle 34 may be mounted to the cover 14 and may define a axis of rotation 36. The spindle 34 may be mounted to the cover 14 by a bearing or a bushing for rotation of the spindle relative to the cover. Alternatively, the spindle may be stationarily mounted to the cover. The seed disk may be provided with a central aperture 40 by which the seed disk 22 may be placed on the spindle 34. When assembled, a drive gear 42 carried by the housing 12 may engage teeth 44 on the periphery of the seed disk 22. A drive motor and drive train (not shown) may connect to the drive gear 42 to cause rotation of the drive gear and hence rotation of the seed disk about the spindle axis 36. When the seed disk 22 is rotated, the pressure differential across the seed disk may operate to cause seeds to be adhered to the seed face 28 of the disk at the apertures 30. As the disk rotates, seed is carried, individually and in sequence, to a release point where the seeds are removed from or released from the seed disk and moved or dropped sequentially to a furrow opened in the soil beneath the seed meter.

To avoid the occurrence of two or more seeds being adhered to an aperture 30 of the seed disk 22, resulting in multiple seeds being planted at the same location, a doubles eliminator 50 may be provided to interfere with, or jostle, the seeds on the apertures to remove the excess seeds, leaving a single seed on the aperture. The doubles eliminator may be provided with a support frame 52 and a pair of engaging elements, inner engaging element 54 and outer engaging element 56. The support frame 52 may be made of molded plastic, cast metal or aluminum as a single piece structure. Alternatively, the support frame 52 may be assembled from two or more components fastened together. The engaging elements 54 and 56 may engage the seed face 28 of the seed disk 22 as described below. The support frame 52 may include a center hub portion 58 which may house a bearing 60 for placement of the support frame on the spindle 34. The bearing 60 may be a ball bearing as shown or may be a low friction bushing. Alternatively, the center hub portion 58 may rest directly on the spindle 34.

Figure 2:
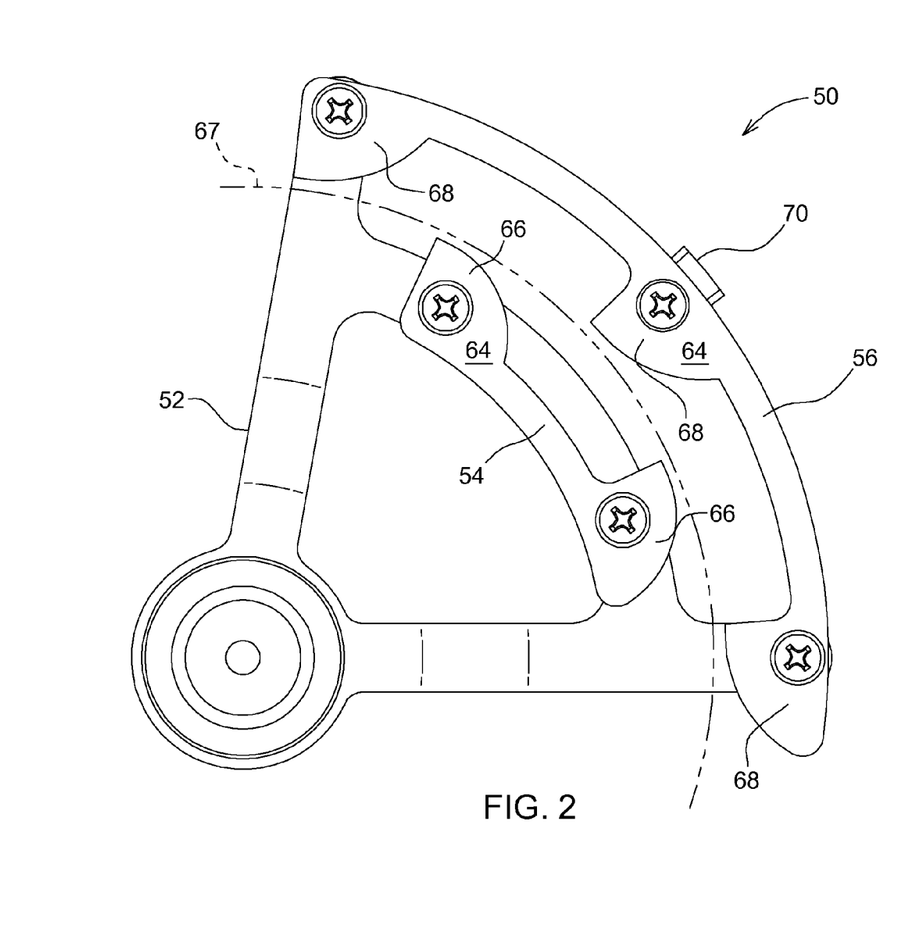
FIG. 2 is a perspective view of a doubles eliminator of the seed meter of FIG. 1.
Figure 3:
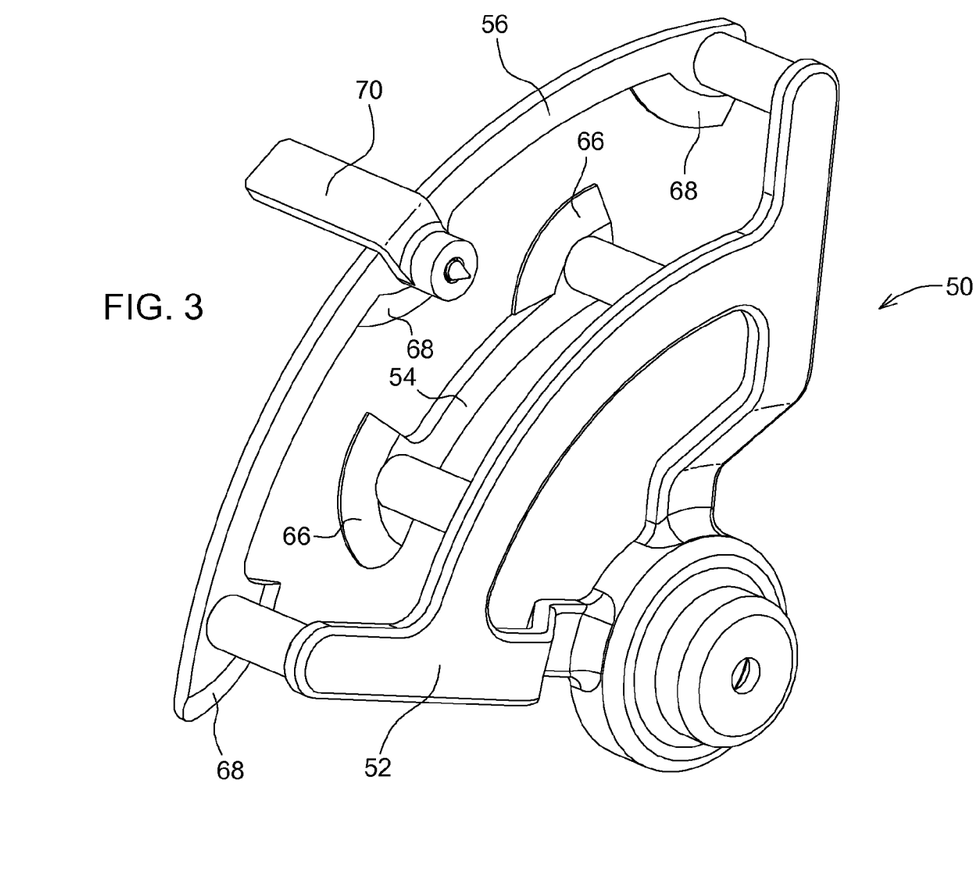
FIG. 3 is an elevational view of the doubles eliminator of FIG. 2.

The inner and outer engaging elements 54 and 56 may be mounted to axially extending posts 62 of the support frame 52. Each of the engaging elements 54, 56 may have coplanar contacting surfaces 64, which may engage the seed face 28 of the seed disk 22. The inner engaging element 54 may be provided with two circumferentially spaced lobes 66 that are located radially inwardly of the circular path 67 of the apertures 30 of the seed disk 22. The lobes 66 may be positioned to interfere with seeds being carried by the apertures, especially when more than one seed is on a given aperture 30. The outer engaging element may be provided with three lobes 68 that are positioned radially outwardly of the circular path 67 of the apertures 30. The lobes 68 likewise may interfere with excess seed on any given aperture. In the arrangement shown, the seeds alternatingly encounter outer lobes 68 and inner lobes 66 starting with an outer lobe 67 although only a single inner lobe 66 and a single outer lobe 68 may be sufficient for removal of seed multiples. The lobes 66, 68 by functioning to remove doubles constitute "functional features" of the doubles eliminator. The engaging elements 54 and 56 may be made of a wear resistant and durable material such as metal or brass.

Figure 5:
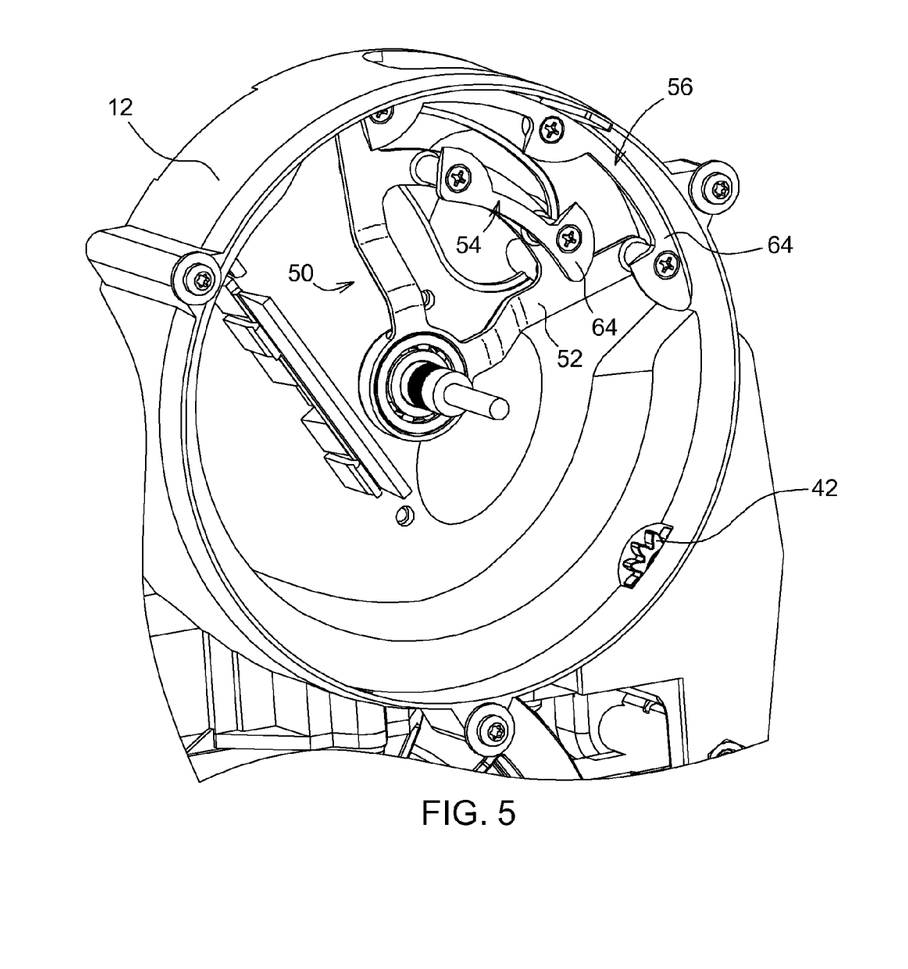
FIG. 5 is a fragmentary perspective view of the seed meter housing.

A rotation stop may be provided on the doubles eliminator 50 to hold the doubles eliminator in a fixed circumferential position about the spindle 34 and axis 36. Shown in the figures, the rotation stop may be an extending tab 70 on the doubles eliminator 50 that seats into a slot 72 in the cover 14. Alternative rotation stops may include shoulders or projections on the meter housing 12 that engage or cradle the support frame 52. Biasing elements 76 may be provided in the meter housing 12 to bias the engaging element 54 and 56 against the seed face 28 of the seed disk 22. Biasing elements 76 may be in the form of spring loaded plunger inserts press fit into sleeve 78 in the meter housing. The support frame 52, posts 62 and the engaging elements 54 and 56 are all made of a rigid material. In this context, "rigid" means that these components are of sufficient rigidity to hold the doubles eliminator 50 in the desired axial position when urged into position by the biasing elements 76.

Mounting the doubles eliminator on the spindle 34 radially locates the doubles eliminator functional elements, i.e. features, relative to the apertures 30 on the seed disk 22. The biasing elements 76 axially locate the functional elements in a position on the seed disk surface. In this case, the inner and outer engaging elements 54, 56 are biased axially into contact with the seed face 28 of the seed disk. The engaging elements 54 and 56, together with the hub 59 of the doubles eliminator, provide three point contact to axially position the doubles eliminator relative to the seed disk 22. The rotation stop locates the functional elements in a circumferential position relative to the seed disk and meter housing. The hub of the doubles eliminator 50 may also be used to axially position the doubles eliminator. The hub may engage the outer race of bearing 60 to position the doubles eliminator 50.

Figure 6:
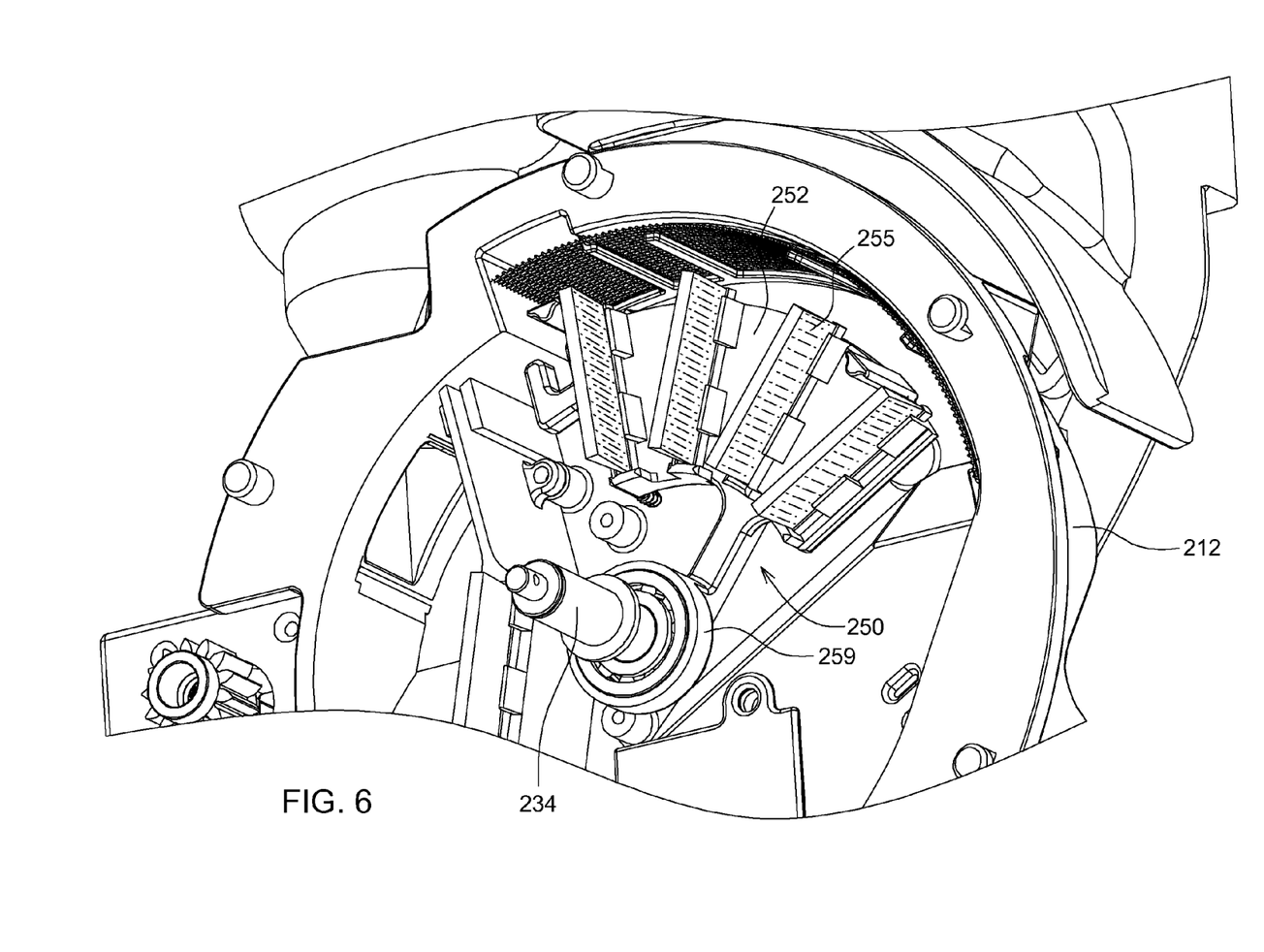
FIG. 6 is a perspective view of an alternative embodiment of the doubles eliminator.

An alternative embodiment of the doubles eliminator is shown in FIG. 6. There, the doubles eliminator 250 has a support frame 252. Like the previous embodiment, the doubles eliminator 250 is mounted to the meter spindle 234, which is in turn mounted to the housing cover, not shown. The doubles eliminator 250 has a number of functional elements 253 which are shown as brushes 255 that are flexible. These brushes 255 engage the seed disk surface adjacent the apertures 30 to jostle seeds thereon to cause extra seeds to be removed. Since the brushes 255 are flexible, the support frame is formed with rigid fingers 258 that extend axially to distal ends 259. The distal ends 259 contact the disk seed face 28. The fingers 258 may be integrally formed as part of the support frame but may be assembled to the frame if desired. The fingers 258, together with the hub 259 of the doubles eliminator, provide three points for axial location of the doubles eliminator and thus axial location of the functional elements, i.e. brushes 255, relative to the seed face of the disk 22. Like the previous embodiment, biasing elements 76, are used to urge the fingers 258 of the doubles eliminator, against the seed disk. Again, in this context, "rigid" means that the support frame 252 and fingers 258 are of sufficient rigidity to hold the doubles eliminator in the desired axial position when urged into position by the biasing elements 76. The term "flexible" as used above to describe the fun brushes 255 of the doubles eliminator means that they are not of sufficient rigidity to hold the doubles eliminator in the desired axial position. The result is radial and axial positioning of the doubles eliminator relative to the apertures in the seed disk or other singulating element.

Figure 7:
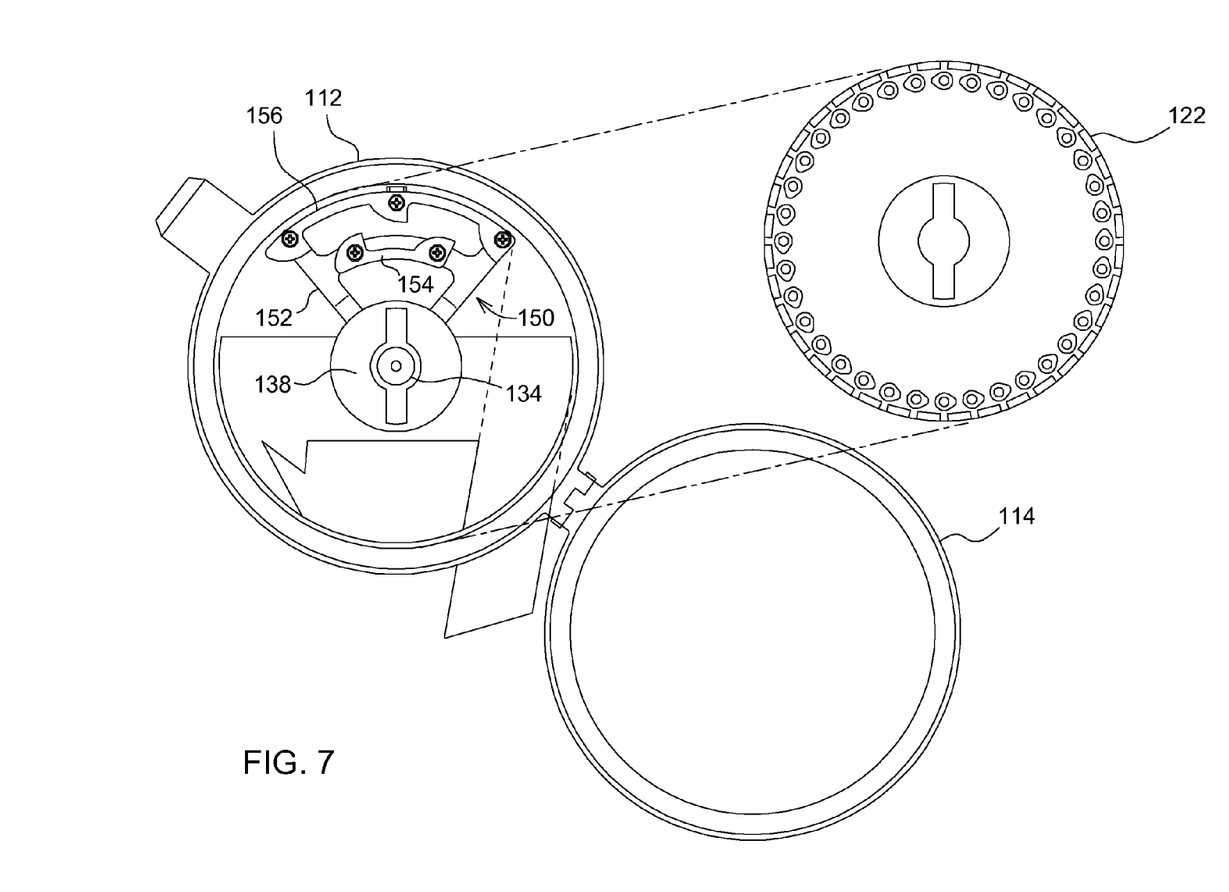
FIG. 7 is an exploded perspective view of an alternative embodiment of the seed meter with the doubles eliminator of FIGS. 1-5.

As described above, the spindle may be mounted to the cover 14. Alternatively, the spindle may be mounted to the meter housing 12. The spindle is described as being fixed, i.e. non-rotating, with the seed disk driven rotationally by teeth 44 on the periphery. In an alternative embodiment shown in FIG. 7, the spindle 134 may be driven rotationally and the seed disk may be mounted to the spindle for rotation therewith. There, a spindle 134 is supported in the meter housing 112 and driven for rotation in a conventional manner such as by chains and sprockets, flexible drive cables, or electric or hydraulic motors. A drive hub 138 may be connected to the spindle and the seed disk 122 may be connected to the drive hub in a conventional manner. The doubles eliminator 150 is placed on the spindle 134 or on the drive hub 138 which itself is mounted on the spindle 134. The doubles eliminator 150 may include a support frame 152 and inner and outer engaging elements 154 and 156. A rotation stop similar to the tab 70 and slot 72 described above may be provided between the doubles eliminator 150 and the meter housing 112. A ball bearing or other type of bearing 160 may be provided between the spindle 134 and the doubles eliminator 150 to allow for relative rotation between the spindle 134 and the doubles eliminator 150. A meter cover 114 may be rotatably mounted to the meter housing to enclosed the seed disk 122 once mounted to the drive hub 138.

The seed disk 22 operates as a singulating element to remove seed from the seed pool, one at a time, for deposit of single seeds into the soil. Other embodiments of singulating elements can be used with the doubles eliminator mounted on a common spindle defining the rotational axis for the singulating element. One example is shown in U.S. Pat. No. 8,746,159, incorporated herein by reference, showing a bowl shaped singulating element 100. The meter is a vacuum meter with the concave inside of the bowl member being the seed side. Yet another variation of the singulating element is shown in WO2010/059101, also incorporated by reference, which shows another bowl shaped singulating element 803. This meter is a positive pressure meter with the convex side of the singulating element being the seed side. The reference also shows a "saw tooth" shaped doubles eliminator 807 mounted to the metering housing. In each of these references, the doubles eliminator could be configured to mount to a common spindle with the singulating member or element and biased in an axial direction against the singulating element.

By positioning the doubles eliminator on a common spindle with the seed disk or other type of rotating singulating element, tolerance stack-up between the location of the functional elements of the doubles eliminator, i.e. fairly rigid lobes or flexible elements such are brushes, and the location of the apertures in the singulating element are reduced, thereby providing more precise operation of the doubles eliminator and thus, more precise operation of the seed meter.

Having described one or more embodiments of a seed meter, it will become apparent that various modifications can be made without departing from the scope of the invention as defined in the accompanying claims.

The invention claimed is:

1. A seed meter for singulating seed from pool of seed comprising:
   a singulating element rotatable about a rotation axis defined by a spindle, the singulating element having a circular array of apertures to which seeds are adhered; and
   a doubles eliminator mounted to the same spindle as the singulating element and having features engaging the singulating element adjacent the apertures to engage and remove excess seed from the apertures as the apertures move past the features to reduce the occurrence of multiple particles adhered to the apertures, wherein the doubles eliminator includes a support frame having portions contacting a seed face of the singulating element and further comprising at least one biasing element urging the portions of the doubles eliminator contacting the seed face of the seed singulating element axially into engagement with the seed face of the seed singulating element.

2. The seed meter of claim 1 wherein the features engaging the singulating element adjacent the apertures to remove excess particles from the apertures are flexible members.

3. The seed meter of claim 1 further comprising two biasing elements urging the doubles eliminator engaging features against the seed face of the seed singulating element.

4. The seed meter of claim 3 wherein the two biasing elements are circumferentially spaced apart from one another.

5. The seed meter of claim 1 wherein the at least one biasing element includes a spring biased plunger.

6. The seed meter of claim 1 wherein the at least one biasing element is mounted to a meter housing.

7. The seed meter of claim 1 further comprising a rotation stop preventing the doubles eliminator from rotation about the axis.

8. The seed meter of claim 1 further comprising a bearing between the doubles eliminator and the spindle.

9. The seed meter of claim 1 wherein the spindle is driven for rotation.

10. The seed meter of claim 1 wherein the engaging features of the doubles eliminator include at least one lobe positioned radially inwardly of the apertures in the seed singulating element and at least one lobe positioned radially outwardly of the apertures in the seed singulating element.

11. The seed meter of claim 1 wherein the engaging features of the doubles eliminator are rigid.

* * * * *